United States Patent [19]

Grotto

[11] 3,998,656
[45] Dec. 21, 1976

[54] METHOD AND APPARATUS FOR CLEANING CYLINDRICAL AIR FILTERS

[76] Inventor: La Von P. Grotto, R.R. No. 3, Box 62, Litchfield, Minn. 55355

[22] Filed: Jan. 7, 1976

[21] Appl. No.: 647,105

[52] U.S. Cl. .................................. 134/33; 34/8; 34/58; 15/304; 134/153; 134/157
[51] Int. Cl.² .......................................... B08B 7/00
[58] Field of Search ............. 134/23, 33, 153, 157; 34/58, 8; 15/302, 304

[56] References Cited

UNITED STATES PATENTS

| 2,242,901 | 5/1941 | Birch | 15/304 X |
| 2,699,793 | 1/1955 | Buck et al. | 134/143 |
| 3,538,926 | 11/1970 | Nesbitt | 134/102 |
| 3,733,639 | 5/1973 | Timian | 15/304 |

FOREIGN PATENTS OR APPLICATIONS

| 221,045 | 10/1958 | Australia | 34/58 |

*Primary Examiner*—Arthur D. Kellogg
*Attorney, Agent, or Firm*—Merchant, Gould, Smith, Edell, Welter & Schmidt

[57] ABSTRACT

Apparatus for cleaning pleated paper and other hollow cylindrical filters by centrifugal force combined with reverse air flow. A housing carrying a rotatable platform supports one end of the filter, and a closure unit for a housing aperture centers the filter by contact with the other end and frictionally rotates it through the contacting surface. Filter rotation is concurrent with removal of air from the housing around the filter, to be replaced by air drawn through the filter as a whole through the centering and driving components of the closure unit. Means for facilitating the emptying of collected material from the housing is shown, as is means for adapting the structure for use as a simple vacuum cleaner.

8 Claims, 5 Drawing Figures

U.S. Patent     Dec. 21, 1976     3,998,656
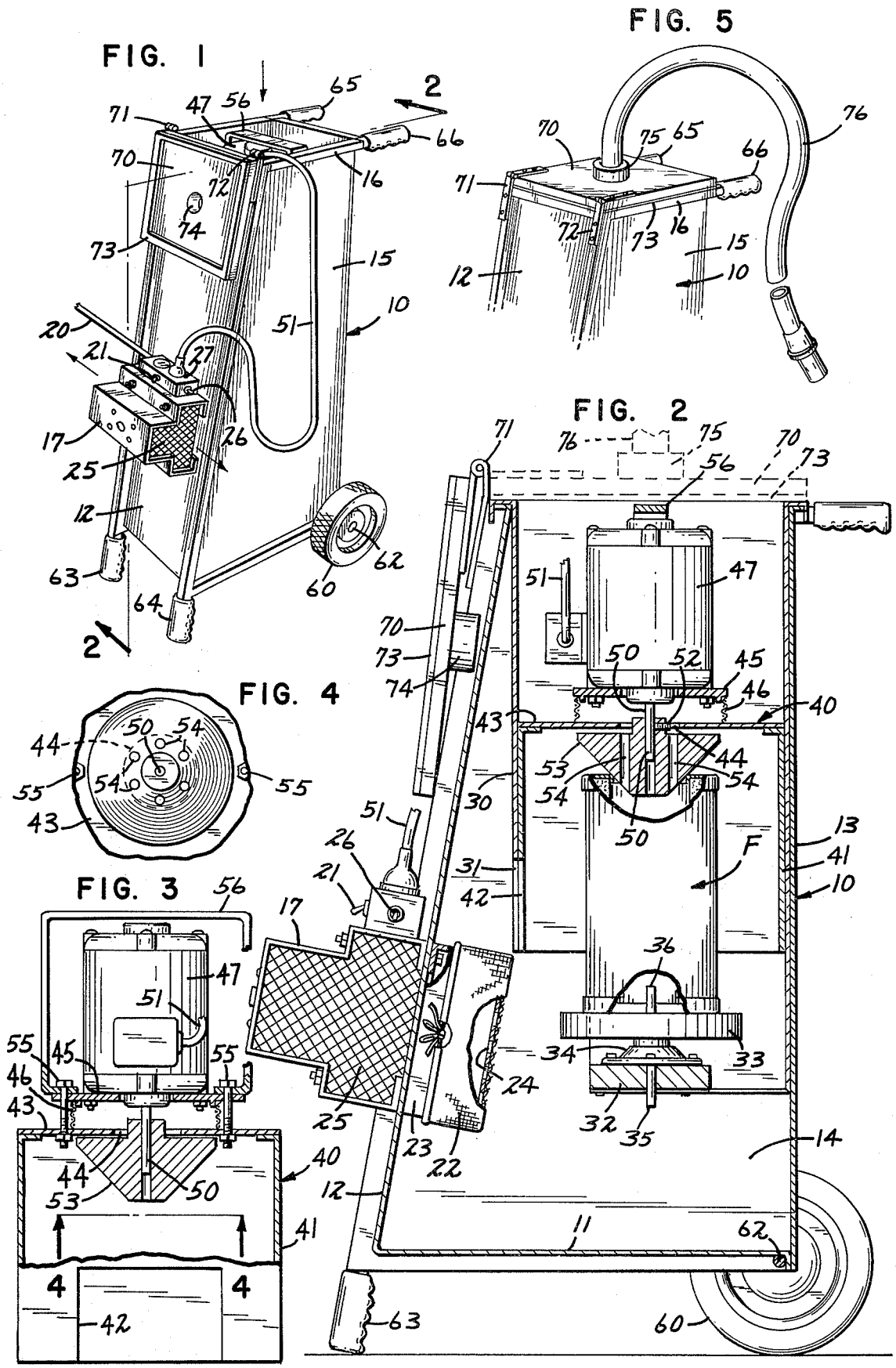

METHOD AND APPARATUS FOR CLEANING CYLINDRICAL AIR FILTERS

BACKGROUND OF THE INVENTION

This invention relates to the mechanic arts, and comprises an arrangement for conveniently and economically cleaning air filters, particularly hollow cylindrical pleated paper filters. Such filters are well known and accepted for use in various applications, and are usually installed so that the air flow through them is from the outside to the inside. When such a filter has seen a period of use the particulate matter trapped on its outer surface increases its resistance to the passage of air beyond what can be tolerated, and the filter is then replaced and discarded.

A common use for filters of this sort is as air cleaners in farm tractors, earth moving equipment, and so forth. In such environments, the service demanded of air cleaners is especially severe, the very use of the tractor often raising clouds of dust which surround the vehicle. In such service, the period of use before a filter is intolerably loaded with particulate matter is frequently a mere matter of days, and replacement costs become prohibitive.

An obvious solution to this problem is to clean the filter and replace it, rather than discarding it, and a number of rough and ready cleaning procedures have been tried. Simplest, and least effective, is to remove the filter and jar or shake it to cause the accumulated dust to fall off the collecting surfaces. Washing with water from a hose can be performed, as can blowing off the dust by compressed air when the farmer has the air available. Water softens the paper and may convert some of the dirt to mud which soaks into the paper: the water itself may remain in portions of the filter for some period of time, not only partially obstructing the filter, but attracting dust particles in a way which makes them even more difficult to remove later. Compressed air cleaning in the reverse direction is often effective, but is also often found to physically damage the filters by reason of the excessive force unavoidably exercised by air impinging on limited areas of the filter. Pleated paper filters do not have the ability to withstand the forces involved, and fail during cleaning.

SUMMARY OF THE INVENTION

This invention provides apparatus and a method of cleaning such filters for successful reuse. I have found that reverse flow of air through the whole filter, when combined with the application of centrifugal force, is capable of satisfactorily cleaning these filters without damaging them, and my invention comprises means for simultaneously applying reverse flow and centrifugal force to filters for cleaning purposes, which is simple, reliable, inexpensive, and well adapted for use by farmers on their own premises, enabling the filters to be quickly cleaned for reuse rather than being discarded. I provide a closed housing with an open top, below which are mounted a platform for rotatably supporting one end of the filter and a vacuum source for reducing the air pressure in the housing outside the filter. A removable closure unit is slidable vertically above the platform, and carries means including a motor for centering the filter on the platform and for frictionally causing rotation of the filter, the weight of the closure unit being sufficient to ensure adequate frictional driving engagement. The housing is mounted on wheels, for convenient transportation, in a way which facilitates inverting the housing for easy discharge of material collected from the filters. As an adjunct, I provide a displaceable cover movable into sealed relation with the open top of the housing, to which a conventional vacuum cleaner hose may be attached to give the appropriate additional versatility.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing, FIG. 1 is a view in perspective of a filter cleaner according to my invention;

FIG. 2 is a view in section taken along the line 2—2 of FIG. 1; portions thereof broken away and shown in section;

FIG. 3 is a view of my closure unit taken at right angles to the view of FIG. 2, parts being shown in section for clarity of illustration;

FIG. 4 is a fragmentary view in the direction indicated by the line 4—4 in FIG. 3, and FIG. 5 is a fragmentary view like FIG. 1 showing a different arrangement of the apparatus.

DESCRIPTION OF THE PREFERRED EMBODIMENT

Now referring to the drawing in detail, my invention is shown as arranged to clean a filter F and comprising a housing 10 having a closed bottom 11, a front panel 12, a rear panel 13, and side panels 14 and 15. The top of the housing is open, and may be surrounded by a reinforcing frame 16. Front panel 12 has inserted therein the power unit of a commercial vacuum cleaner 17 including a motor energized through an extension cord 20 by operation of a switch 21 to drive a blower which draws air from within the housing through a filter bag 22, secured around an inlet 23 having a perforated end 24, and discharges it through a pair of grills one of which is shown at 25. Also energized through cord 20 by operation of a switch 26 is a convenience outlet 27. Except for its upper open end, housing 10 is substantially airtight.

A tubular liner 30 extends downwardly from frame 16, being cut away in front at 31 as necessary to clear inlet 23. Across the otherwise open bottom of liner 35 is secured a cross member 32 carrying at its center a platform 33 rotatable on a bearing 34 with a central shaft 35 which extends beyond the platform at an upper end 36.

Slidable in liner 30 is a closure unit 40 which comprises a tubular member 41 sized to be a sliding fit in liner 30 and cut away in front at 42 as necessary to clear inlet 23. Member 41 has a closed upper end or top 43 with a large central aperture 44. A motor mounting base 45 having an apertured perimeter 46 is secured on top 43 and supports a motor 47 having a vertical shaft 50 which extends downwardly through aperture 44. Motor 47 is energized through an extension cord 51 which may be connected to receptacle 27 for control by switch 26. Secured to shaft 50 by a set screw 52 is a tapered centering and drive member 53 of wood or other suitable material, which converges downwardly and has a plurality of passages 54 extending therethrough generally parallel to shaft 50. Member 53 is closely spaced below top 43, and aperture 44 is large enough to at least circumscribe passages 54, as indicated by the dotted circle in FIG. 4. Motor 47 and base 45 are secured to top 43 by fasteners 55, together with a handle 56.

Housing 10 is normally supported by a pair of wheels 60 and 61 carried on an axle 62 at the two rear corners of the base, and on a pair of legs 63 and 64 projecting downwardly from the other two corners of the base. A pair of handles 65 and 66 project backwardly from frame 16. For convenience in maneuvering and emptying the cleaner, as will presently be explained, legs 63 and 64 and handles 65 and 66 may be provided with handle grips.

A cover 70 is hinged to frame 16 at 71 and 72, and is provided with a peripheral seal 73 and a central aperture 74 for receiving a connection 75 for a conventional vacuum cleaner hose 76, to give the apparatus increased utility for general vacuum cleaner use.

OPERATION

In use my apparatus is rolled on wheels 60, 62 to a convenient location, and extension cord 20 is connected to a source of electrical energy. Cover 70 is opened to the position shown in FIG. 1, and closure unit 40 is lifted out of liner 30 by handle 56. A filter F to be cleaned is now lowered through liner 30 to rest on platform 33: if the filter is one of those having one closed end with a small central aperture, the filter is arranged with shaft 36 extending upwardly therethrough. Closure unit 40 is now lowered into liner 30 so that member 53 enters the open upper end of filter F and by reason of its tapering surface completes the centering of filter F on platform 33: a brief energization of motor 47 to cause some rotation of platform 33 may facilitate this operation, especially if filter F does not have a small central aperture at either end. Unit 40 is lowered until member 53 engages the inner edge of the upper rim of the filter, and the weight of the unit is sufficient to establish a satisfactory seal and frictional drive from motor 47 to filter F.

Switches 21 and 26 may be operated to initiate the operation of vacuum cleaner 17 and of motor 47. The former lowers the pressure in housing 10, and air flow occurs through the open end of the housing, the apertured portion 46 of base 45, aperture 44 in top 43, and passages 54 to the inside of filter F, and out through the pores of the filter. This flow of air is of course in the reverse direction to the normal flow of air through the filter in normal use and tends to cause discharge of particulate matter carried by the outer surface of the filter. The speed of motor 47 is such that appreciable centrifugal force acts as a result on the particulate matter, tending mechanically to release particles which might be able to withstand the simple reverse air current. The vibration which accompanies motor operation also is of assistance in this respect.

When the filter has been cleaned, switches 21 and 26 are turned off, unit 40 and filter F are removed, and another filter to be cleaned is substituted. This process continues until all of a batch of filters has been cleaned, or until an objectional amount of material collects in housing 10. When this occurs, the housing, less unit 40 and any filter F, is emptied by grasping the handle grips on legs 63 and 64 and pivoting the housing backward vertically about axle 62 until handles 65 and 66 contact the ground or floor. Upon further tilting the particulate matter in housing 10 slides down the back surface of liner 30 and out the open top of the housing. After emptying, the housing is restored to its normal position, and filter bag 22 may be removed and cleaned or replaced, as desired.

The apparatus may be used for general vacuum cleaning, as will now be described: for this purpose, unit 40 may be removed. Cover 70 is pivoted about hinges 71-72 until seal 73 engages frame 16, and hose 76 is applied at connecter 75. Now when switch 21 is closed the air drawn out of the housing by vacuum cleaner 17 is replaced through hose 76, carrying with it matter to be disposed of as in other vacuum cleaners.

From the above, it will be clear that I have invented a new, versatile cleaner which may be used to clean pleated paper filters or other hollow cylindrical filters for reuse, without damage, and for general cleaning purposes. The arrangement is simple in construction and use, easy to empty, highly portable, and adapted to many sizes of filters, on which its action is gentle and jetless but effective. The apparatus is sufficiently versatile to be usable as well for more ordinary vacuum cleaning.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. The jetless method of cleaning a hollow, cylindrical filter to remove particulate matter deposited on the outer surface thereof during normal use which comprises the steps of:
   a. supporting the filter at one end for rotation about an axis;
   b. centering the filter from the other end to bring the axis of the filter into coincidence with the axis of rotation;
   c. lowering the pressure of the air outside the filter;
   d. admitting ambient air to the inside of the filter through the centering means;
   e. causing rotation of said filter, through the centering means, at a speed sufficient to exercise appreciable centrifugal force on particulate matter retained by said filter; and
   f. collecting particulate matter drawn aerodynamically and thrown centrifugally from the outer surface of the filter.

2. The jetless method of cleaning a hollow cylindrical filter to remove particulate matter deposited on the outer surface thereof during normal use which comprises the steps of:
   a. supporting the filter from below for rotation about a vertical axis;
   b. centering the filter from above to bring the axis of the filter into coincidence with the axis of rotation;
   c. lowering the pressure of the air outside of the filter;
   d. admitting ambient air to the inside of the filter through the centering means;

e. causing rotation of the filter, through the centering means, at a speed sufficient to exercise appreciable centrifugal force on particulate matter retained by the filter; and f. collecting particulate matter drawn aerodynamically and thrown centrifugally from the outer surface of the filter.

3. The jetless method of cleaning a hollow cylindrical pleated paper filter to remove particulate matter deposited on the outer surface thereof during normal use which comprises the steps of:

a. supporting the filter at one end for rotation about an axis;

b. centering the filter from the other end to bring the axis of the filter into coincidence with the axis of rotation;

c. lowering the pressure of the air outside of the filter;

d. admitting ambient air to the inside of the filter through the centering means;

e. causing rotation of the filter, through the centering means, at a speed sufficient to exercise appreciable centrifugal force both on particulate matter on the outside of the filter and on air confined between the pleats of the filter; and f. collecting particulate matter drawn aerodynamically and thrown centrifugally from the outer surface of the filter.

4. In combination:

a housing;

a platform in the housing rotatable about an axis;

an opening in said housing in line with said platform;

a closure unit slidable in and removable from said opening;

a motor on the outside of said closure unit having a drive shaft extending within said unit in line with the axis of rotation of said platform;

tapering drive means connected to said drive shaft within said unit, including at least one passage extending therethrough and generally aligned with said axis;

means connecting said passage with the air ambient to said housing;

and means for lowering the pressure in said housing to draw ambient air from said passage through said filter.

5. In combination:

a housing;

a platform in the housing rotatable about a vertical axis;

an opening in the top of said housing above said platform;

a closure unit slidable vertically in and removable from said opening;

a motor on the outside of said closure unit having a vertical drive shaft extending within said unit in line with the axis of rotation of said platform;

tapering drive means connected to said drive shaft within said unit, including at least one passage extending therethrough and generally aligned with said axis;

means connecting said passage with the air ambient to said housing;

and means for lowering the pressure in said housing to draw ambient air from said passage through said filter.

6. Cleaning apparatus comprising in combination:

a housing having an open top and a rotatable filter supporting platform;

means drawing air out of said housing at a location below said top and said platform;

a closure unit insertable in said open top to center and drive a hollow cylindrical filter on said platform and to direct reverse air flow therethrough;

a displaceable cover for said top movable into sealing relation therewith;

and a hose connection aperture in said cover.

7. In combination:

a hollow cylindrical pleated paper filter;

means supporting said filter at one end for rotation about a first axis;

means at the other end of said filter for centering said filter and driving it to rotate at a speed sufficient to exercise appreciable centrifugal force on particulate matter depoisted on the outside of the filter and on the air confined between the pleats of the filter;

and means including the named means for causing air to flow through said filter as a whole in a direction opposite to the normal direction of flow therethrough and at substantially more than the normal rating.

8. In combination:

a housing;

a platform in the housing rotatable about a vertical axis to support one end of a filter to be cleaned;

an opening in the top of said housing above said platform;

a closure unit slidable vertically in and removable from said opening;

means in said closure unit for engaging the other end of said filter to center the filter above the axis of said platform and to drive it for rotation thereabout, the weight of said closure unit being sufficient to enable the frictional drive;

and means including the centering means for drawing air outwardly through said filter;

the speed of rotation of said filter being sufficient to exercise appreciable centrifugal force on matter retained by said filter independently of the aerodynamic force acting thereon.

* * * * *